United States Patent
Gal et al.

(10) Patent No.: US 12,120,581 B1
(45) Date of Patent: Oct. 15, 2024

(54) REACHING AN ASSET TRACKING DEVICE ON DEMAND

(71) Applicant: Samsara Inc., San Francisco, CA (US)

(72) Inventors: David Gal, Oakland, CA (US); Vinay Nair, Mckinney, TX (US); Pierre Gavaret, Novato, CA (US); Wael Barakat, San Francisco, CA (US); Daniel Brenner, San Bruno, CA (US)

(73) Assignee: Samsara, Inc., San Francisco, CA (US)

( * ) Notice: Subject to any disclaimer, the term of this patent is extended or adjusted under 35 U.S.C. 154(b) by 0 days.

(21) Appl. No.: 18/626,121

(22) Filed: Apr. 3, 2024

Related U.S. Application Data

(60) Provisional application No. 63/503,438, filed on May 19, 2023.

(51) Int. Cl.
*H04W 4/029* (2018.01)
*H04W 76/28* (2018.01)

(52) U.S. Cl.
CPC ........... *H04W 4/029* (2018.02); *H04W 76/28* (2018.02)

(58) Field of Classification Search
CPC ..... H04W 4/14; H04W 4/70; H04W 52/0209; H04W 8/205
USPC .............................. 455/456.1, 574, 458, 434
See application file for complete search history.

(56) References Cited

U.S. PATENT DOCUMENTS 10,334,428 B1 * 6/2019 Chen ..................... H04W 8/205
10,979,871 B2 4/2021 Hajimiri et al.

OTHER PUBLICATIONS

IEEE 802.Nov. 2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
Vos, G., "What is eDRX (Extended Discontinuous Reception)?", Sierra Wireless, IOT Blog, Jul. 28, 2022, pp. 1-4.
Yasukawa, K., "Waking and Interacting with an IoT Device in eDRX Mode On Demand," Soracom Blog, Aug. 23, 2019, pp. 1-7.

* cited by examiner

*Primary Examiner* — Joseph Arevalo
(74) *Attorney, Agent, or Firm* — Nicholson, De Vos, Webster & Elliott, LLP

(57) ABSTRACT

A method performed by an asset tracking device is disclosed to track an asset. The method comprises receiving, while operating in an extended discontinuous reception mode, a carrier messaging service message from a carrier network, transmitting a connection request to a management server to establish a connection with the management server in response to receiving the carrier messaging service message, receiving, from the management server over the connection, an instruction to use a specified backend check-in schedule until a specified condition is met, and responsive to receiving the instruction, using the specified backend check-in schedule to check in with the management server until the specified condition is met. The method further comprises reverting back to using a default backend check-in schedule to check in with the management server after the specified condition has been met.

15 Claims, 8 Drawing Sheets

REACHING AN ASSET TRACKING DEVICE ON DEMAND

CROSS-REFERENCE TO RELATED APPLICATIONS

This application claims the benefit of U.S. Provisional Application No. 63/503,438, filed May 19, 2023, which is hereby incorporated by reference.

TECHNICAL FIELD

Embodiments of the invention relate to the field of asset tracking, and more specifically, to methods and apparatus for reaching an asset tracking device on demand to cause the asset tracking device to check in with a management server before the asset tracking device's next scheduled backend check-in time.

BACKGROUND

A fleet operator may operate a fleet of assets. The fleet operator may use a fleet management system to manage its fleet. The fleet management system may provide asset tracking functionality. Asset tracking refers to tracking the location of physical assets. The physical assets that a fleet operator may want to track include unpowered assets (e.g., trailer dollies, storage containers, dumpsters, heavy machinery equipment, rail cars, and/or generators) and/or powered assets (e.g., tractors, tow trucks, semi-trucks, light or heavy trucks, cars, vans, buses, and/or aircraft).

A fleet management system may include a management server and multiple asset tracking devices. A fleet operator may track a physical asset (a powered asset or an unpowered asset) by mounting an asset tracking device on the asset that transmits location data (and possibly other sensor data) to the management server (e.g., which may be located in a cloud) over a network (e.g., a wide area network (WAN)). The asset tracking device may be powered by an internal battery and/or an external power source (e.g., the power source of a powered asset on which the asset tracking device is mounted). When the asset tracking device is being powered by an internal battery, it is important for the asset tracking device to operate in a power-efficient manner to prolong the battery life.

Conventional asset tracking devices that are powered by an internal battery stay in a low-power mode for most of the time (e.g., to conserve battery) and occasionally wake up from the low-power mode to check in with a management server and report their location. For example, a typical asset tracking device might wake up and check in with the management server every 12 hours or every 24 hours. The schedule with which an asset tracking device wakes up and attempts to check in with the management server may be referred to as a backend check-in schedule. The backend check-in schedule of an asset tracking device is configured to balance acceptable communication delays with the power consumption of the asset tracking device. The asset tracking device is not reachable when it is operating in a low-power mode. The backend check-in schedule is configured on the asset tracking device and thus it is the asset tracking device that initiates connections with the management server. As such, the management server must wait for the asset tracking device to initiate the connection before being able to communicate with the asset tracking device. That is, the management server is not able to initiate a connection with an asset tracking device and thus is not able to communicate with the asset tracking device outside of the asset tracking device's scheduled backend check-in times. If, for whatever reason, an asset tracking device fails to establish a connection with the management server during a scheduled backend check-in time, the asset tracking device typically waits until the next scheduled backend check-in time before trying to establish a connection with the management server again. As a result, the management server may have to wait until the next scheduled backend check-in time before it is able to communicate with the asset tracking device, further delaying communication. As a result of the delay, the management server is not able to ascertain the location of the asset tracking device in a timely manner, which means the user of the fleet management system is not informed of the location of the asset in a timely manner.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
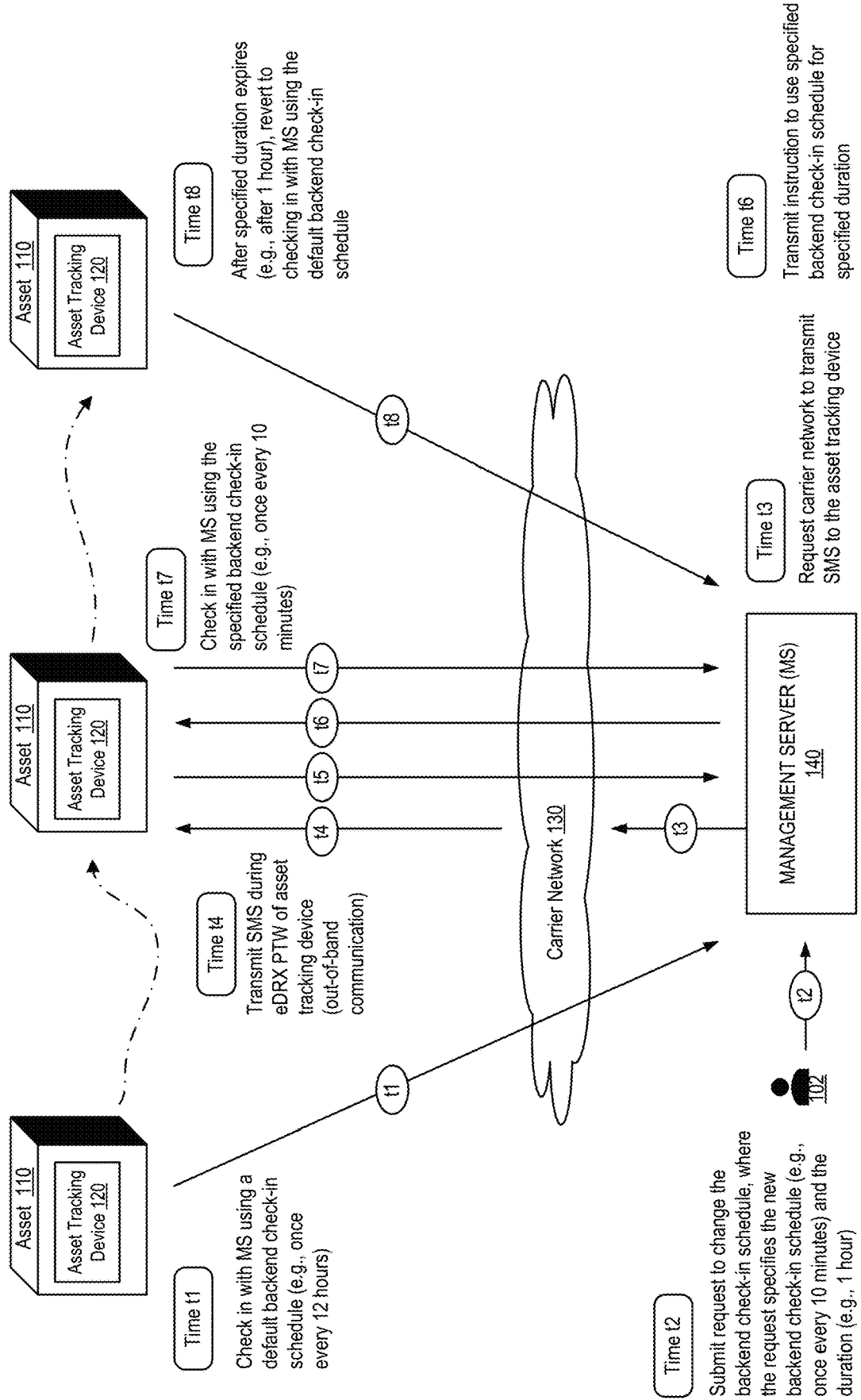
FIG. 1 is a diagram showing an environment in which an asset tracking device can be reached on demand, according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments. However, such notation should not be taken to mean that these are the only options or optional operations, and/or that blocks with solid borders are not optional in certain embodiments.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As mentioned above, conventional asset tracking devices that are powered by an internal battery stay in a low-power mode for most of the time and occasionally wake up from the low-power mode (e.g., every 12 hours or 24 hours) to check in with a management server and report their location. The management server is not able to initiate a connection with an asset tracking device and thus is not able to communicate with the asset tracking device outside of the asset tracking device's scheduled backend check-in times.

Embodiments provide a mechanism for a management server to reach an asset tracking device on demand to cause the asset tracking device to check in with the management server before the asset tracking device's next scheduled backend check-in time. In an embodiment, the asset tracking device connects to a carrier network (e.g., a mobile/cellular network) using extended discontinuous reception (eDRX) or similar technology. eDRX is a technology used in carrier networks that allows for configuring how long a device stays in a low-power mode before it wakes up to listen for any network indications for pending data. In the past (e.g., with eDRX's predecessor, discontinuous reception (DRX)), the length of time that a device connected to the carrier network would stay in low-power mode before waking up was dictated by the network (e.g., typically 1.28 seconds or 2.56 seconds). However, with DRX, the device, rather than the network, may choose the length of time it will stay in a low-power mode-a period referred to as the eDRX cycle. The asset tracking device may negotiate the length of the eDRX cycle it will use with the carrier network (e.g., the asset tracking device may negotiate for a long eDRX cycle so that it can stay in a low-power mode for a long time, allowing it to conserve power). In an embodiment, the management server reaches the asset tracking device on demand (e.g., responsive to a user request to locate the asset on which the asset tracking device is mounted) by transmitting a request to the carrier network to send a carrier messaging service message (e.g., a short messaging service (SMS) message, a multimedia messaging service (MMS) message, or similar text/media message that is transported via the carrier network outside of a traditional network socket context) to the asset tracking device. In response to receiving the request from the management server, the carrier network may wait until the beginning of the asset tracking device's next eDRX paging timing window (PTW) (i.e., when the asset tracking device is expected to wake up from a low-power mode to listen for indications of pending data) to transmit the carrier messaging service message to the asset tracking device. The carrier messaging service message may indicate to the asset tracking device (explicitly or implicitly) that the asset tracking device should check in with the management server. In response to receiving the carrier messaging service message, the asset tracking device may send a connection request to the management server to establish a connection with the management server. Once the connection is established, the asset tracking device may send location data and/or other type of sensor data to the management server over the connection. As previously mentioned, conventional asset tracking devices only wake up and check in with the management server at scheduled backend check-in times (which is typically relatively infrequent (e.g., every 12 or 24 hours) to conserve battery). In contrast, embodiments allow the management server to reach an asset tracking device on demand to cause the asset tracking device to check in with the management server outside of the asset tracking device's scheduled backend check-in times.

In an embodiment, the management server provides a graphical user interface (GUI) that allows a user (e.g., a fleet operator) to request that the management server reach an asset tracking device on demand to cause the asset tracking device to check in with the management server outside of the asset tracking device's scheduled backend check-in times. Such functionality may be referred to herein as "ping-on-demand" functionality and may be triggered based on the user activating a button or other element of the GUI. The ping-on-demand functionality may be used for a variety of practical purposes. For example, a user may use the ping-on-demand functionality to send a firmware update to the asset tracking device before the asset tracking device's next scheduled backend check-in time. This gives the user the ability to force a firmware upgrade on the asset tracking device relatively quickly without having to wait until the asset tracking device's next scheduled backend check-in time (e.g., such feature may be particularly desirable if the current version of the firmware installed on the asset tracking device is known to have a critical security vulnerability). As another example, a user may use the ping-on-demand functionality to cause an asset tracking device to report its location before the asset tracking device's next scheduled backend check-in time. This allows the user to locate the asset on which the asset tracking device is mounted relatively quickly without having to wait until the asset tracking device's next scheduled time.

In an embodiment, a user may use the ping-on-demand functionality to change the asset tracking device's backend check-in schedule (e.g., so that the asset tracking device checks in with the management server more frequently or less frequently compared to the asset tracking device's current check-in frequency). In an embodiment, the change to the asset tracking device's backend check-in schedule can be permanent or temporary. For example, the asset tracking device may use the new backend check-in schedule, and then revert to using its default backend check-in schedule once a specified condition has been met (e.g., after a specified duration (e.g., one hour) has expired). The new backend check-in schedule may have more frequent check-ins to help better locate an asset on which the asset tracking device is mounted. For example, if it is believed that the asset tracking device is mounted on an asset that is being stolen, a user may configure the asset tracking device to check-in and report its location to the management server more frequently (e.g., every five minutes instead of every 12 hours) to better track the location of the asset. The asset tracking device may revert to using the default backend check-in schedule after the specified condition has been met. The condition may be set such that the new backend check-in schedule remains in effect until a specified duration expires, until the asset tracking device has attempted to establish a connection with the management server a certain number of times regardless of success, until the asset tracking device has successfully established a connection with the management server a certain number of times, until a specified time, or until the management server instructs the asset tracking device to revert to using the default backend check-in schedule. Thus, how temporary the change to the backend check-in schedule should remain in effect may be different depending on the implementation.

Embodiments described herein offer one or more advantages over conventional asset tracking mechanisms. An advantage of embodiments is that they allow the management server to reach an asset tracking device before the asset tracking device's next scheduled backend check-in time (e.g., the management server can typically reach the asset tracking device within one eDRX cycle), while consuming less power (e.g., compared to maintaining a constant connection with the management server or connecting to the network using DRX).

Embodiments can leverage this feature to change an asset tracking device's backend check-in schedule on demand-before the asset tracking device's next scheduled backend check-in time. For example, the asset tracking device's backend check-in schedule can be changed/configured so that the asset tracking device checks in with the management server more frequently to better locate the asset on which the asset tracking device is mounted. Also, embodiments can reduce the power consumption of the device by having the asset tracking device automatically revert back to using the default backend check-in schedule once a specified condition has been met (e.g., which helps avoid a scenario where the asset tracking device keeps using the new backend check-in schedule (which has more frequent check-ins and thus consumes more power) even after the asset has been located because the user forgets to change the asset tracking device's backend check-in schedule back to the default backend check-in schedule).

Embodiments are further described herein with reference to the accompanying figures.

FIG. 1 is a diagram showing an environment in which an asset tracking device can be reached on demand, according to some embodiments. The environment includes a management server 140, an asset 110, and an asset tracking device 120 mounted on the asset 110. The asset 110 may belong to a fleet of assets managed/operated by a fleet operator. The management server 140 and the asset tracking device 120 may be part of a fleet management system that the fleet operator uses to manage its fleet. The fleet management system may provide functionality that allows a user 102 (e.g., a fleet operator) to be able to track the location of the asset 110 and other assets of the fleet.

The asset 110 may be a physical asset that is to be tracked by the fleet management system. The asset 110 may change location over time (e.g., because the asset 110 itself is mobile or the asset 110 is loaded on a moving vehicle). The asset 110 may be an unpowered asset such as an intermodal container, a piece of construction equipment, a dumpster, a light tower, a portable toilet, or a trailer, just to name a few examples. Alternatively, the asset 110 may be a powered asset such as a tractor, a tow truck, a semi-truck, a light or heavy truck, a car, a van, a bus, or other type of vehicle, just to name a few examples. A powered asset may have a power source that can be used to power electronic devices such as the asset tracking device 120.

The asset tracking device 120 may be an electronic device that is mounted on the asset 110 to enable the fleet management system to track the location of the asset 110. When the asset tracking device 120 is mounted on an unpowered asset, it may rely entirely on its internal battery for power. When the asset tracking device 120 is mounted on a powered asset, it may be powered by the power source of the powered asset at least some of the time and powered by the asset tracking device's 120 internal battery at other times (e.g., the asset tracking device 120 may be powered by the external power source when the external power source is available and providing power to the asset tracking device 120 but be powered by the internal battery when the external power source is not available or not providing power to the asset tracking device). In some embodiments, the asset tracking device 120 does not receive power from the power source of the powered asset (e.g., the asset tracking device 120 relies entirely on its internal battery for power even though it is mounted to a powered asset).

The asset tracking device 120 may connect to the carrier network 130 and communicate with the management server 140 over a connection that spans the carrier network 130 and possibly one or more other networks. The carrier network 130 may be a mobile/cellular network such as a Fifth Generation (5G) mobile network or similar network that provides a carrier messaging service such as short messaging service (SMS) and/or multimedia messaging service (MMS). The asset tracking device 120 may include a cellular modem or similar component that enables the asset tracking device 120 to wirelessly connect to the carrier network 130. The asset tracking device 120 may also include a location sensor (e.g., a Global Positioning System (GPS) sensor) that enables the asset tracking device 120 to obtain location data (e.g., GPS coordinates). In some embodiments, the asset tracking device 120 obtains location data from a nearby device that is equipped with a location sensor (e.g., if the asset tracking device 120 itself does not have a location sensor). The asset tracking device 120 may record location data and transmit the location data to the management server 140 via the carrier network 130. In some embodiments, the asset tracking device 120 can transmit other types of sensor data to the management server 140 (e.g., temperature measurement data, humidity measurement data, pressure measurement data, acceleration measurement data, etc.).

The asset tracking device 120 may stay in a low-power mode for most of the time (e.g., to conserve battery) and occasionally wake up from the low-power mode to check in with the management server (e.g., initiate a connection with the management server 140 and report its location). The asset tracking device 120 may check in with the management server 140 using a backend check-in schedule. The backend check-in schedule of an asset tracking device 120 is configured to balance acceptable communication delays and the power consumption of the asset tracking device 120. Typically, asset tracking devices are configured with a backend check-in schedule that has relatively infrequent check-ins (e.g., every 12 hours or every 24 hours) to conserve battery.

In an embodiment, the asset tracking device 120 is coupled with one or more wireless sensing devices (WSDs) (not shown in the diagram). The WSDs may be electronic devices that include one or more sensors for detecting physical events (e.g., temperature, humidity, barometric pressure, CO2 concentration, acceleration, pressure, sound, movement, etc.) and recording sensor data (e.g., sensor measurements) in response to the detection of these physical events. The WSDs may be small electronic devices that are attachable to an object for recording sensor data related to physical events related to the object or its surroundings (e.g., recording changes in temperature, movement of an object (e.g., a door being closed/opened), sudden accelerations of a vehicle, etc.). The WSDs may record sensor data over a period of time. The WSDs may record sensor data at regular intervals of time (e.g., the WSDs may detect the temperature of a room, or an object (e.g., refrigerator or food product), and record corresponding temperature measurements every N seconds or minutes). The sensor data may be stored in a non-transitory computer readable medium of the WSDs. Each of the WSDs may be coupled to an asset tracking device 120 and establish a connection with the asset tracking device 120 to transfer the recorded sensor data to the asset tracking device 120. In some embodiments, a WSD connects to the asset tracking device 120 via a wireless communication interface (e.g., Bluetooth Low Energy (BLE) or WiFi). The asset tracking device 120 may transmit sensor data received from WSDs to the management server 140. In this sense, the asset tracking device 120 in some embodiments functions as a gateway/intermediary between WSDs and the management server 140. In an embodiment, the asset tracking device 120 is implemented as described herein below with reference to FIG. 7.

The management server 140 may receive data from one or more asset tracking devices. For example, the management server 140 may receive location data from one or more asset tracking devices to track the location of the various assets on which the asset tracking devices are mounted. The management server 140 may provide a GUI that allows a user 102 (e.g., a fleet operator) to perform management operations for a fleet, including tracking the locations of the various assets belonging to the fleet. For example, the GUI may display the last known locations of the various assets belonging to the fleet. In an embodiment, the management server 140 is implemented as described herein below with reference to FIG. 8.

As mentioned above, with conventional asset tracking mechanisms, the management server 140 is not able to communicate with an asset tracking device 120 outside of the asset tracking device's 120 scheduled backend check-in times. As will be described in additional detail herein, embodiments allow the management server 140 to reach the asset tracking device 120 on demand and cause the asset tracking device 120 to check in with the management server 140, even outside of the asset tracking device's scheduled backend check-in times. Embodiments still allow the asset tracking device 120 to consume little power, while at the same time allowing the asset tracking device 120 to be reachable on demand within a reasonable amount of time (e.g., before the asset tracking device's 120 next scheduled backend check-in time). In some embodiments, this ping-on-demand feature can be used to change the asset tracking device's backend check-in schedule before the asset tracking device's next scheduled backend check-in time.

Operations for reaching an asset tracking device on demand will now be described with reference to the diagram to help illustrate an embodiment.

In an embodiment, the asset tracking device 120 operates in eDRX mode when connected to the carrier network 130. The asset tracking device 120 may use a particular eDRX configuration when operating in eDRX mode. The eDRX configuration may define the eDRX cycle length and the eDRX PTW length that the asset tracking device 120 is to use. The eDRX cycle refers to the period of time during which a device is in a low-power mode. The eDRX cycle length refers to the length of this period. The eDRX PTW refers to the period of time during which a device is awake and listens for indications of pending data from the carrier network 130. The eDRX PTW length refers to the length of this period. The asset tracking device 120 may negotiate the eDRX configuration (e.g., the eDRX cycle length and/or the eDRX PTW length) that it is to use with the carrier network 130.

At time t1, the asset tracking device 120 may check in with the management server 140 using a default backend check-in schedule. The default backend check-in schedule may have relatively infrequent check-ins to conserve battery. For example, the default backend check-in schedule may have check-ins every 12 hours or every 24 hours.

At time t2, the user 102 may submit a request to the management server 140 (e.g., via a GUI provided by the management server 140) to change the asset tracking device's 120 backend check-in schedule. The user's request may specify the new backend check-in schedule that the asset tracking device is to use and may also specify the duration (a length of time) for which the new backend check-in schedule should remain in effect. In an embodiment, the management server 140 provides a GUI that allows the user to specify the new backend check-in schedule and the duration. The specified backend check-in schedule may have relatively more frequent check-ins compared to the default/previous backend check-in schedule. For example, the specified backend check-in schedule may have check-ins every 10 minutes (instead of every 12 hours or 24 hours). In general, the user 102 may want the asset tracking device 120 to use a backend check-in schedule that has relatively frequent check-ins if the user 102 wishes to better locate an asset 110 that is in motion. Also, in general, the user 102 may want the asset tracking device 120 to use a backend check-in schedule that has relatively less frequent check-ins if the user 102 wishes to prolong the battery life of the asset tracking device 120. The duration for which the specified backend check-in schedule should remain in effect may be expressed in hours, minutes, or other units of time. For example, the user 102 may specify the duration to be one hour.

Responsive to receiving the request from the user, at time t3, the management server 140 may transmit a request to the carrier network 130 (e.g., via a SMS API) to transmit a SMS message to the asset tracking device 120. An SMS message is a type of carrier messaging service message. A carrier messaging service message is considered to be an out-of-band message because it is transported via the carrier network 130 outside of a traditional network socket context (e.g., outside of a Transmission Control Protocol and Internet Protocol (TCP/IP) connection). Although the example shown in the diagram uses an SMS message, other embodiments may use a different type of carrier messaging service message such as an MMS message.

Responsive to receiving the request from the management server 140, the carrier network 130 may wait until the asset tracking device's 130 next eDRX PTW (when the asset tracking device is expected to wake up from a low-power mode to listen for indications of pending data from the carrier network 130), and at time t4, the carrier network 130 transmits the SMS message to the asset tracking device 120 during the eDRX PTW of the asset tracking device 120. In an embodiment, the SMS message includes a command for the asset tracking device to check in with the management server 140. In some embodiments, the transmission of the SMS message itself implicitly indicates to the asset tracking device 120 that it should check in with the management server 140 (even without any explicit instructions in the SMS message).

Responsive to receiving the SMS message, at time t5, the asset tracking device 120 may transmit a connection request to the management server to establish a connection with the management server (e.g., a TCP/IP connection). Once the connection is established, the asset tracking device 120 may transmit sensor data (e.g., location data) to the management server 140 over the connection. The management server's 140 use of an SMS message allows the management server 140 to reach the asset tracking device 120 before the asset tracking device's 120 next scheduled backend check-in time. The asset tracking device's 120 use of eDRX allows the asset tracking device 120 to consume less power (e.g., compared to staying awake all the time), while still allowing the asset tracking device 120 to be reachable within a reasonable amount of time (e.g., typically within one eDRX cycle).

At time t6, the management server 140 may transmit, to the asset tracking device 120 over the established connection, an instruction to use the specified backend check-in schedule for the specified duration.

Responsive to receiving the instruction from the management server 140, at time t7, the asset tracking device 120 may begin using the specified backend check-in schedule to check in with the management server 140 (e.g., check in once every 10 minutes).

In this example, it is assumed that the specified duration expires at time t8. Thus, at time t8, responsive to determining that the specified duration has expired, the asset tracking device 120 may revert back to using the default backend check-in schedule to check in with the management server 140. Automatically reverting to using the default backend check-in schedule once the duration expires may help conserve the battery of the asset tracking device 120 by preventing the asset tracking device 120 from continuing to use a backend check-in schedule that consumes more power. While the example shown in the diagram uses the expiration of a specified duration as the condition upon which the asset tracking device 120 reverts to using the default backend check-in schedule, other embodiments may use a different condition. For example, the asset tracking device 120 may revert to using the previous/default backend check-in schedule after the asset tracking device 120 has attempted to establish a connection with the management server a certain number of times regardless of success, after the asset tracking device 120 has successfully established a connection with the management server a certain number of times, at a specified time, or when the management server 140 instructs the asset tracking device 120 to revert to using the default backend check-in schedule.

While the diagram shows a single asset tracking device 120 to simplify explanation, it should be appreciated that a typical environment will have multiple such asset tracking devices for tracking multiple geographically dispersed assets. The management server 140 may use the operations described above or similar operations to reach these asset tracking devices on demand to cause them to check in with the management server before their next scheduled backend check-in times. In some embodiments, the assets may belong to the same organization (a tenant/customer of the fleet management system) or to multiple organizations (multiple tenants/customers of the fleet management system).

Figure 2:
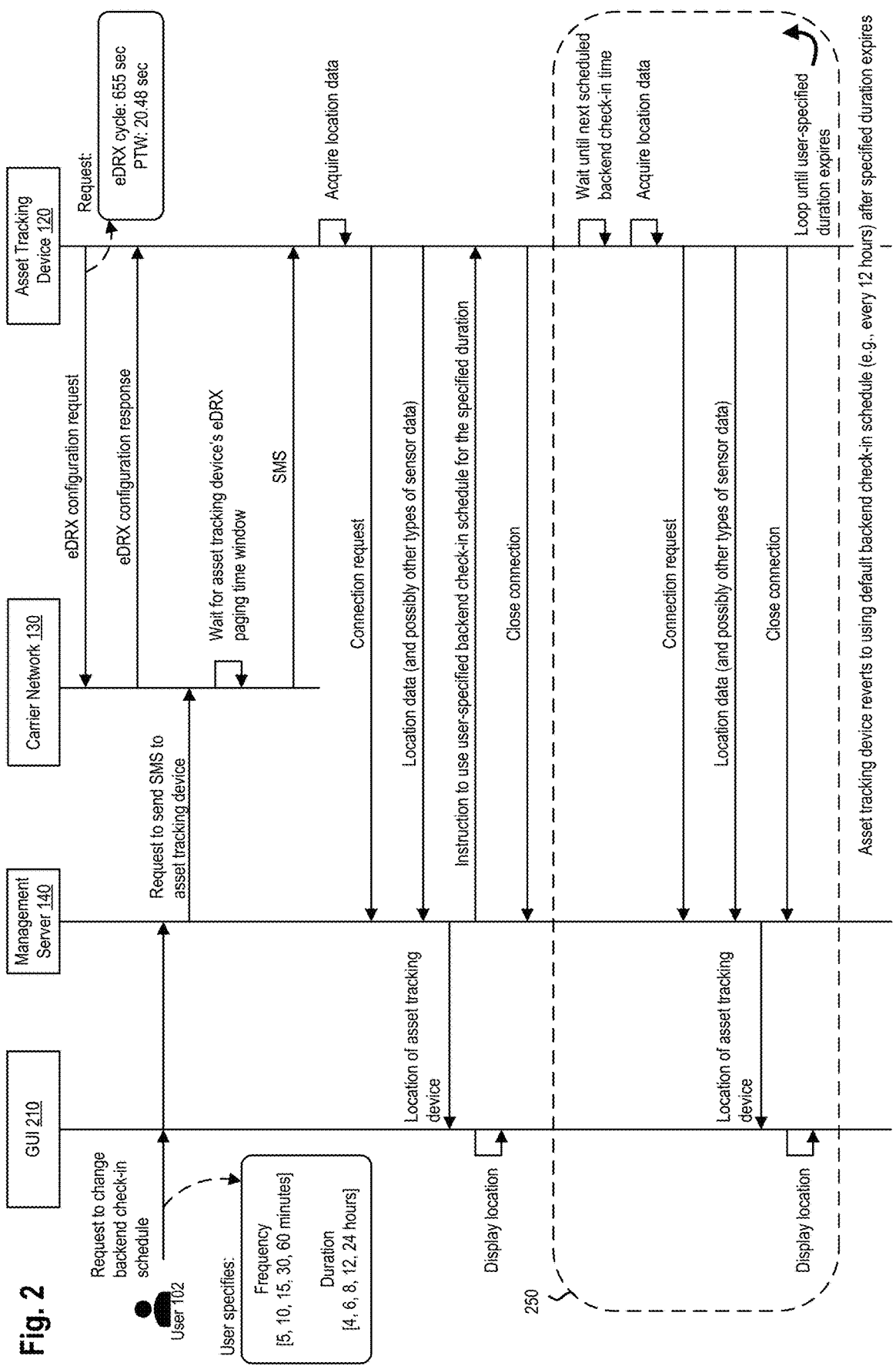
FIG. 2 is a diagram showing component interactions for reaching an asset tracking device on demand, according to some embodiments.

FIG. 2 is a diagram showing component interactions for reaching an asset tracking device on demand, according to some embodiments.

As shown in the diagram, the asset tracking device 120 may transmit an eDRX configuration request to the carrier network 130 to request the use of a particular eDRX configuration. For example, the asset tracking device may request an eDRX cycle length of 655 seconds and an eDRX PTW length of 20.48 seconds, although it should be appreciated that other configurations are possible. Responsive to receiving the eDRX configuration request, the carrier network 130 may respond by transmitting an eDRX configuration response to the asset tracking device 120 indicating whether the eDRX configuration request is accepted or rejected. In an embodiment, if the carrier network 130 rejects the eDRX configuration request, the carrier network 130 proposes an alternative eDRX configuration for the asset tracking device 120 to use in the eDRX configuration response. In this example, it is assumed that the asset tracking device's 120 eDRX configuration request was accepted (e.g., and thus the asset tracking device 120 will use an eDRX cycle length of 655 seconds and an eDRX PTW length of 20.48 seconds).

A user 102 may submit, to the management server 140 via the GUI 210 provided by the management server 140, a request to change the asset tracking device's 120 backend check-in schedule. The request may specify a new backend check-in schedule and a duration for which the new backend check-in schedule should remain in effect. As an example, the new backend check-in schedule may be specified in terms of check-in frequency (e.g., the GUI 210 may allow the user to select a frequency of every 5, 10, 15, 30, or 60 minutes). The duration may be specified as a length of time in hours or other units of time (e.g., the GUI 210 may allow the user to select a duration of 4, 6, 8, 12, or 24 hours).

Responsive to receiving the instruction from the user 102, the management server 140 may transmit a request to the carrier network 130 to send a SMS message to the asset tracking device 120.

The carrier network 130 may wait for the asset tracking device's 120 next eDRX PTW and transmit the SMS message to the asset tracking device 120 during the asset tracking device's 120 eDRX PTW. If the asset tracking device 120 is configured to use an eDRX cycle length of 655 seconds, then the waiting time is expected to be shorter than 655 seconds. The SMS message may be considered an "out-of-band" communication since it is a communication that occurs outside of a traditional network socket context (e.g., outside of a TCP/IP connection). The transmission of the SMS message may indicate (explicitly or implicitly) to the asset tracking device 120 that it should check in with the management server 140.

Responsive to receiving the SMS message, the asset tracking device 120 may acquire location data. The asset tracking device 120 may acquire the location data (e.g., GPS coordinates) using a GPS sensor included in the asset tracking device 120 or obtain the location data from a nearby device (e.g., a WSD connected to the asset tracking device 120). The asset tracking device 120 may then transmit a connection request to the management server 140 to establish a connection with the management server 140 (e.g., open a socket). In an embodiment, the connection is a TCP/IP connection. Once the connection is established, the asset tracking device 120 may transmit the acquired location data, and possibly other types of sensor data, to the management server 140 over the connection.

The management server 140 may provide the location data it received from the asset tracking device 120 (or a processed version of the data) to the GUI 210 and the GUI 210 may display the location to the user 102 (e.g., on a map). The management server 140 may also transmit, to the asset tracking device 120 over the connection, an instruction to use the new (user-specified) backend check-in schedule for the specified duration.

Responsive to receiving the instruction from the management server 140, the asset tracking device 120 may update its backend check-in schedule according to the instruction. The asset tracking device 120 may then close the connection (e.g., close the socket).

The asset tracking device 120 may then wait until the next scheduled backend check-in time, in accordance with the new user-specified backend check-in schedule. When the next scheduled backend check-in time arrives, the asset tracking device 120 may acquire location data. The asset tracking device 120 may then transmit a connection request to the management server 140 to establish a connection with the management server 140. Once the connection is established, the asset tracking device 120 may transmit the acquired location data (e.g., GPS coordinates), and possibly other types of sensor data, to the management server 140 over the connection. The management server 140 may provide the location data to the GUI 210 and the GUI 210 may display the location to the user 102. The operations encompassed by the dashed line 250 shown in the diagram may be repeated (in accordance with the new backend check-in schedule) until the user-specified duration expires. That is, the asset tracking device 120 may use the new backend check-in schedule to check in with the management server until the specified duration expires. Once the user-specified duration expires, the asset tracking device 120 may revert to using the default backend check-in schedule to check in with the management server.

In an embodiment, the user 102 can further change the asset tracking device's 120 backend check-in schedule and/or the duration while the asset tracking device 120 is using the new backend check-in schedule (e.g., while the asset tracking device 120 is performing the operations encompassed by the dashed line 250). For example, while the asset tracking device 120 is using a first user-specified backend check-in schedule that is different from the asset tracking device's 120 default backend check-in schedule, the user may submit a request to the management server 140 to have the asset tracking device 120 use a second user-specified backend check-in schedule and to extend the current duration by another hour. The management server 140 may then transmit an instruction to the asset tracking device 120 to use the second user-specified backend check-in schedule (instead of the first user-specified backend check-in schedule) and to extend the duration by one hour. Once the extended duration expires, the asset tracking device 120 may revert to using the default backend check-in schedule to check in with the management server 140.

It should be noted that if the carrier network 130 does not support the particular eDRX configuration requested by the asset tracking device 120 or there are other issues/problems with the asset tracking device's 120 ability to use eDRX (e.g., eDRX is not available/supported at the asset tracking device's 120 current location), the SMS message might not reach the asset tracking device 120. In this case, the asset tracking device 120 will not check in with the management server 140 until the asset tracking device's 120 next scheduled backend check-in time. In such a case, the management server 140 may inform the user via the GUI 210 that the asset tracking device 120 currently cannot be reached on demand (and possibly also indicate when the management server 140 will attempt to reach the asset tracking device 120 again) when the user submits the request to the GUI 210 (e.g., by displaying a message on the GUI 210 when the user activates a button or other GUI element(s) to submit the request). In an embodiment, the management server 140 may invoke an API provided by the carrier network 130 to determine the current status of eDRX support at the asset tracking device's 120 current location.

In an embodiment, management server 140 is able to configure the eDRX cycle length and/or the eDRX PTW length used by the asset tracking device 120. In an embodiment, the management server 140 allows the user 102 to configure the eDRX cycle length and/or the eDRX PTW length used by the asset tracking device 120 (e.g., via the GUI 210). Thus, the user 102 may be able to adjust these eDRX parameters to the user's 102 liking to balance the tradeoff between latency of the SMS message reaching the asset tracking device 120 and the asset tracking device's 120 battery life. In an embodiment, the eDRX cycle length is set to 655 seconds. This setting has been found to provide acceptable battery life for the asset tracking device 120, while satisfying general user expectations of latency.

In an embodiment, the asset tracking device 120 keeps track of how long it has been using the new backend check-in schedule so that in the case where it loses contact with the management server 140, it is still able to revert to using the previous/default backend check-in schedule when the specified duration expires.

In an embodiment, the SMS message is used to instruct the asset tracking device 120 to perform other tasks besides reporting its location. For example, the SMS message may include an instruction for the asset tracking device 120 to reset, perform a firmware upgrade, or run some arbitrary command(s).

In an embodiment, the management server 140 uses an application programming interface (API) provided by the carrier network 130 to determine the base station (e.g., cell tower) that the asset tracking device 120 is currently connected to. This may allow the management server 140 to determine a rough estimate of the asset tracking device's 120 current location (assuming that the location of the base station is known) and to provide the rough estimate of the location to the user 102 (e.g., via the GUI 210) even before the SMS message reaches the asset tracking device 120.

An alternative to sending an SMS message to the asset tracking device 120 would be to try to send a user datagram protocol (UDP) message to the asset tracking device 120, but that would require the management server 140 to know the IP addresses assigned to every asset tracking device, which is not possible unless the asset tracking devices are assigned static IP addresses. Even if asset tracking devices 120 are assigned static IP addresses, the carrier network 130 would have to buffer the UDP messages until the asset tracking device's next eDRX PTW. However, some carriers do not guarantee that their network will buffer UDP messages and so the UDP messages could be lost. Embodiments that use SMS do not suffer from such limitations.

In an embodiment, the asset tracking device 120 operates in the eDRX mode using an eDRX cycle length that is longer than a network address translation (NAT) timeout length used by the carrier network 130. Longer eDRX cycles can reduce the power consumption of the asset tracking device 120 and thus improve battery life. With embodiments, the asset tracking device 120 can be assigned a dynamic Internet Protocol (IP) address and NAT can still be used in the network. A network device performing NAT in a network will forget a dynamically assigned IP address if the network device is not regularly seeing a TCP/IP or UDP traffic using that dynamically assigned IP address. Often times, the time between an asset tracking device's 120 scheduled backend check-in times is too long to rely on a network device performing NAT to remember the dynamically assigned IP address. Thus, embodiments described herein have the advantage of allowing a lower power asset tracking device 120 to continue to use a backend check-in schedule that is significantly longer than the length of the eDRX cycle (e.g., a backend check-in schedule in the realm of hours, such as every 6, 12 or 24 hours), be assigned a dynamic IP address, connect to the management server 140 over a network that uses NAT, and still support the ability to reach the asset tracking device on demand to cause the asset tracking device to check in with the management server sooner than the asset tracking device's next scheduled backend check-in time (e.g., as soon as the asset tracking device's next PTW).

Figure 3B:
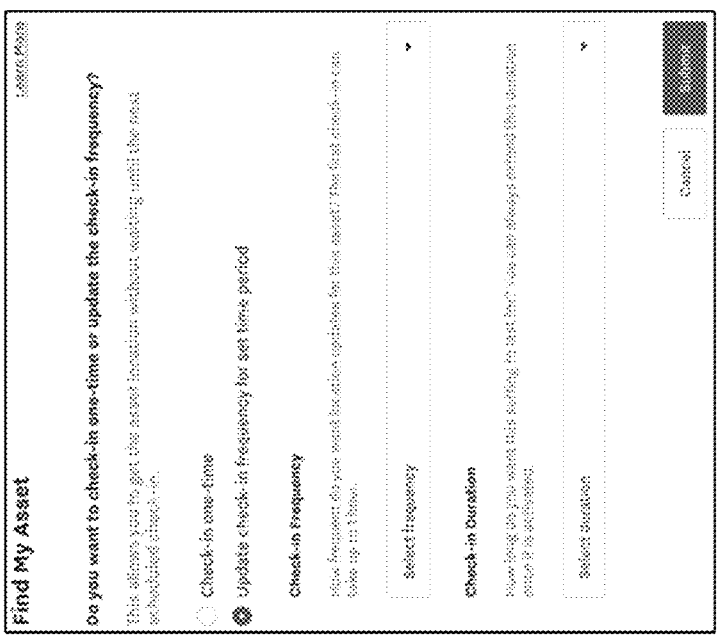
FIG. 3B is a diagram showing a GUI that allows a user to change an asset tracking device's backend check-in schedule and specify the duration for which the new backend check-in schedule should remain in effect, according to some embodiments.
Figure 3A:
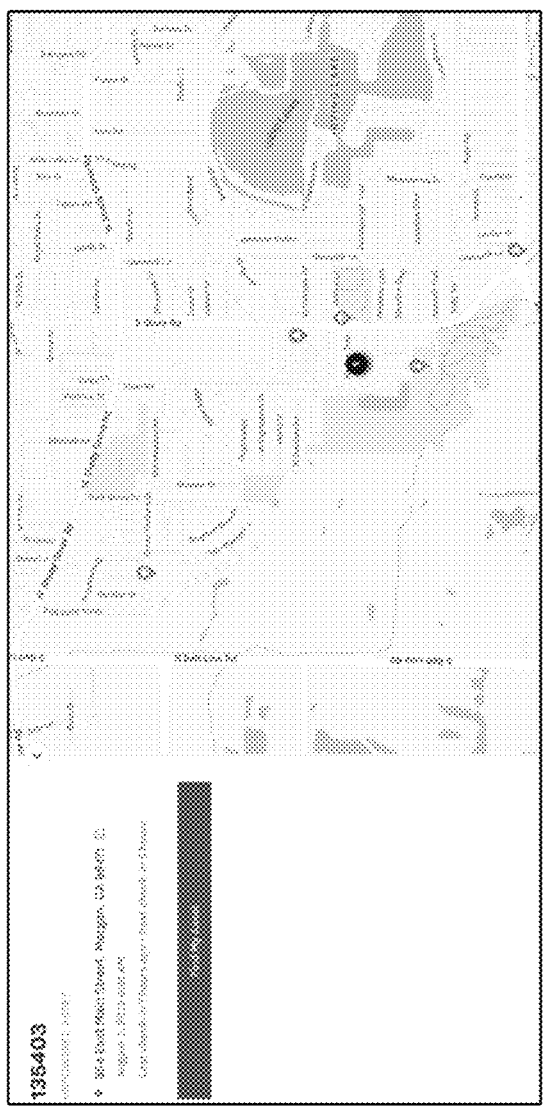
FIG. 3A is a diagram showing a graphical user interface (GUI) that allows a user to submit a request to reach an asset tracking device on demand, according to some embodiments.

FIG. 3A is a diagram showing a GUI that allows a user to submit a request to reach an asset tracking device on demand, according to some embodiments.

The GUI displays information regarding an unpowered asset on which an asset tracking device is mounted (asset "135403"), including the asset's last known location ("554 East Main Street . . . "), the asset tracking device's last backend check-in time ("7 hours ago"), and the asset tracking device's next scheduled backend check-in time ("in 5 hours"). In this example, the asset tracking device is using a backend check-in schedule having a check-in frequency of every 12 hours. The GUI includes a "Find My Asset" button that a user can activate to reach the asset tracking device on demand. If the user activates the "Find My Asset" button, the GUI shown in FIG. 3B may be displayed (e.g., as a pop-up window or a separate page) to allow the user to change the asset tracking device's backend check-in schedule and to specify the duration for which the new backend check-in schedule should remain in effect.

FIG. 3B is a diagram showing a GUI that allows a user to change an asset tracking device's backend check-in schedule and specify the duration for which the new backend check-in schedule should remain in effect, according to some embodiments.

The GUI allows a user to select an option to have the asset tracking device check in one time ("Check-in one-time" radio button) or to change the asset tracking device's backend check-in frequency for a specified duration ("Update check-in frequency for set time period" radio button).

If the user selects the "Check-in one-time" radio button and activates the "Submit" button, the management server may cause the asset tracking device to check in with the management server before the asset tracking device's next scheduled backend check-in time, as described herein above, and report the location of the asset tracking device to the user via the GUI. Thereafter, the asset tracking device may then continue using its default backend check-in schedule to check in with the management server.

If the user selects the "Update check-in frequency for set time period" radio button, the GUI may allow the user to select a check-in frequency (using the "Select frequency" drop down menu) and a duration for which the selected check-in frequency should remain in effect ("Select duration" drop down menu). If the user activates the "Submit" button, the management server may cause the asset tracking device to check in with the management server before the asset tracking device's next scheduled backend check-in time, as described herein above, and transmit an instruction to the asset tracking device to use the user-specified backend check-in frequency for the specified duration. Thereafter, the asset tracking device may use the user-specified backend check-in frequency to check in with the management server for the specified duration.

Figure 4B:
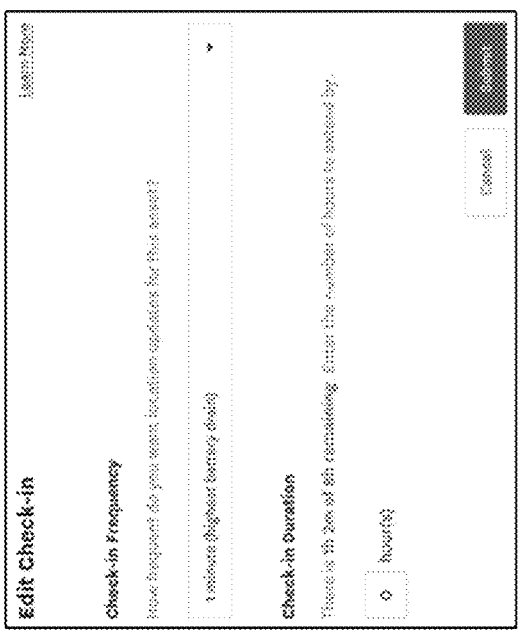
FIG. 4B is a diagram showing a GUI that allows a user to edit an asset tracking device's backend check-in schedule and the duration for which the edited backend check-in schedule should remain in effect, according to some embodiments.
Figure 4A:
FIG. 4A is a diagram showing a GUI that allows a user to edit an asset tracking device's backend check-in frequency, according to some embodiments.

FIG. 4A is a diagram showing a GUI that allows a user to further change an asset tracking device's backend check-in frequency, according to some embodiments.

The GUI may be displayed after the asset tracking device has already been configured to use a new backend check-in frequency for a specified duration (e.g., a user may have configured the asset tracking device to use the new backend check-in frequency using the GUI shown in FIG. 3B). The GUI displays the current status of the asset tracking device's check-in configuration. In this example, the asset tracking device is configured to use a backend check-in frequency of every minute for the next 8 hours (that is why the GUI shows that the asset tracking device's next backend check-in is in one minute and that there are eight hours remaining). The GUI includes an "Edit check-in" button that a user can activate to further change the asset tracking device's backend check-in frequency and/or the duration. If the user activates the "Edit check-in" button, the GUI shown in FIG. 4B may be displayed (e.g., as a pop-up window or a separate page) to allow the user to further change the asset tracking device's backend check-in schedule and the duration for which the backend check-in schedule should remain in effect.

FIG. 4B is a diagram showing a GUI that allows a user to further change an asset tracking device's backend check-in schedule and the duration for which the new backend check-in schedule should remain in effect, according to some embodiments.

The GUI allows the user to select a new backend check-in frequency (e.g., using a drop down menu) and/or the duration for which the new backend check-in frequency should remain in effect (e.g., using an input box in which the user can specify the number of hours by which to extend the current duration). If the user activates the "Submit" button, the management server may cause the asset tracking device to check in with the management server before the asset tracking device's next scheduled backend check-in time, as described herein above, and transmit an instruction to the asset tracking device to use the new backend check-in frequency for the new extended duration. Thereafter, the asset tracking device may use the new backend check-in schedule to check in with the management server for the new extended duration. Once the new extended duration expires, the asset tracking device may revert back to using its default backend check-in schedule. Thus, the GUI may allow the user to further change the asset tracking device's backend check-in schedule while the asset tracking device is already using a non-default backend check-in schedule and/or extend the duration for which a non-default backend check-in schedule remains in effect.

Figure 5:
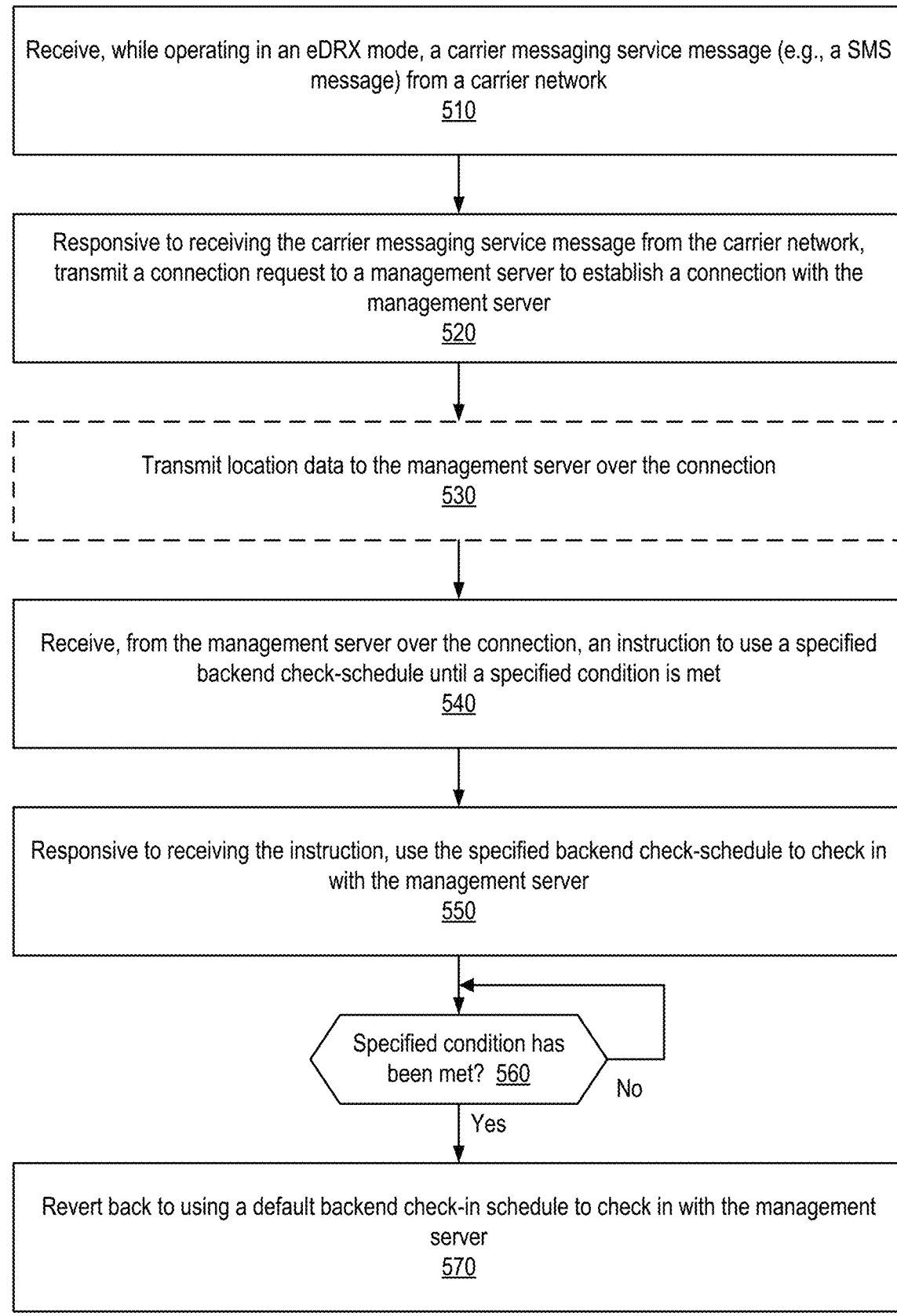
FIG. 5 is a flow diagram showing a method that may be performed by an asset tracking device, according to some embodiments.

FIG. 5 is a flow diagram showing a method that may be performed by an asset tracking device, according to some embodiments.

The operations in the flow diagrams will be described with reference to the example embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams. While the flow diagrams in the figures show a particular order of operations performed by certain embodiments, it should be understood that such order is provided as one example (e.g., alternative embodiments may perform the operations in a different order, combine certain operations, overlap certain operations, etc.).

At operation 510, the asset tracking device receives, while operating in an extended discontinuous reception (eDRX) mode, a carrier messaging service message from a carrier network. In an embodiment, the carrier messaging service message is an SMS message. In an embodiment, the asset tracking device operates in the eDRX mode using an eDRX cycle length that is longer than a NAT timeout length used by the carrier network. In an embodiment, the asset tracking device operates in the eDRX mode using an eDRX cycle length of eleven minutes or 655 seconds. In an embodiment, the carrier messaging service message comprises a command for the asset tracking device. In an embodiment, the command is a command to send location data to the management server. In an embodiment, the command is a command to perform a firmware upgrade.

At operation 520, responsive to receiving the carrier messaging service message from the carrier network, the asset tracking device transmits a connection request to a management server to establish a connection with the management server.

In an embodiment, at operation 530, the asset tracking device transmits location data to the management server over the connection.

At operation 540, the asset tracking device receives, from the management server over the connection, an instruction to use a specified backend check-schedule until a specified condition is met. In an embodiment, the specified condition is an expiration of a specified duration.

At operation 550, responsive to receiving the instruction, the asset tracking device uses the specified backend check-schedule to check in with the management server.

At operation 560, the asset tracking device determines whether the specified condition has been met. If the specified condition has not been met, the asset tracking device continues using the specified backend check-in schedule to check in with the management server. Otherwise, if the specified condition has been met, at operation 570, the asset tracking device reverts back to using a default backend check-in schedule to check in with the management server. In an embodiment, the asset tracking device attempts to check in with the management server more frequently when using the specified backend check-in schedule compared to when the asset tracking device uses the default backend check-in schedule (e.g., the specified backend check-in schedule has more frequent check-ins compared to the default backend check-in schedule to help better locate the asset).

In an embodiment, the asset tracking device receives, from the management server, a second instruction to use a particular eDRX configuration. In an embodiment, responsive to receiving the second instruction, the asset tracking device transmits an eDRX configuration request to the carrier network requesting use of the particular eDRX configuration. In an embodiment, responsive to receiving an eDRX configuration response from the carrier network indicating that the eDRX configuration request is rejected, the asset tracking device transmits a message to the management server indicating that the eDRX configuration request has been rejected.

In an embodiment, the asset tracking device receives, from the management server, an instruction to use a second specified backend check-in schedule until a second specified condition is met. Responsive to receiving the second instruction, the asset tracking device may use the second specified backend check-in schedule to check in with the management server. The asset tracking device may then receive, from the management server before the second specified condition is met, a third instruction to use a third specified backend check-in schedule until a third specified condition is met. Responsive to receiving the third instruction, the asset tracking device may use the third specified backend check-in schedule instead of the second specified backend check-in schedule to check in with the management server. Responsive to determining that the third specified condition has been met, the asset tracking device may revert back to using the default backend check-in schedule to check in with the management server.

Figure 6:
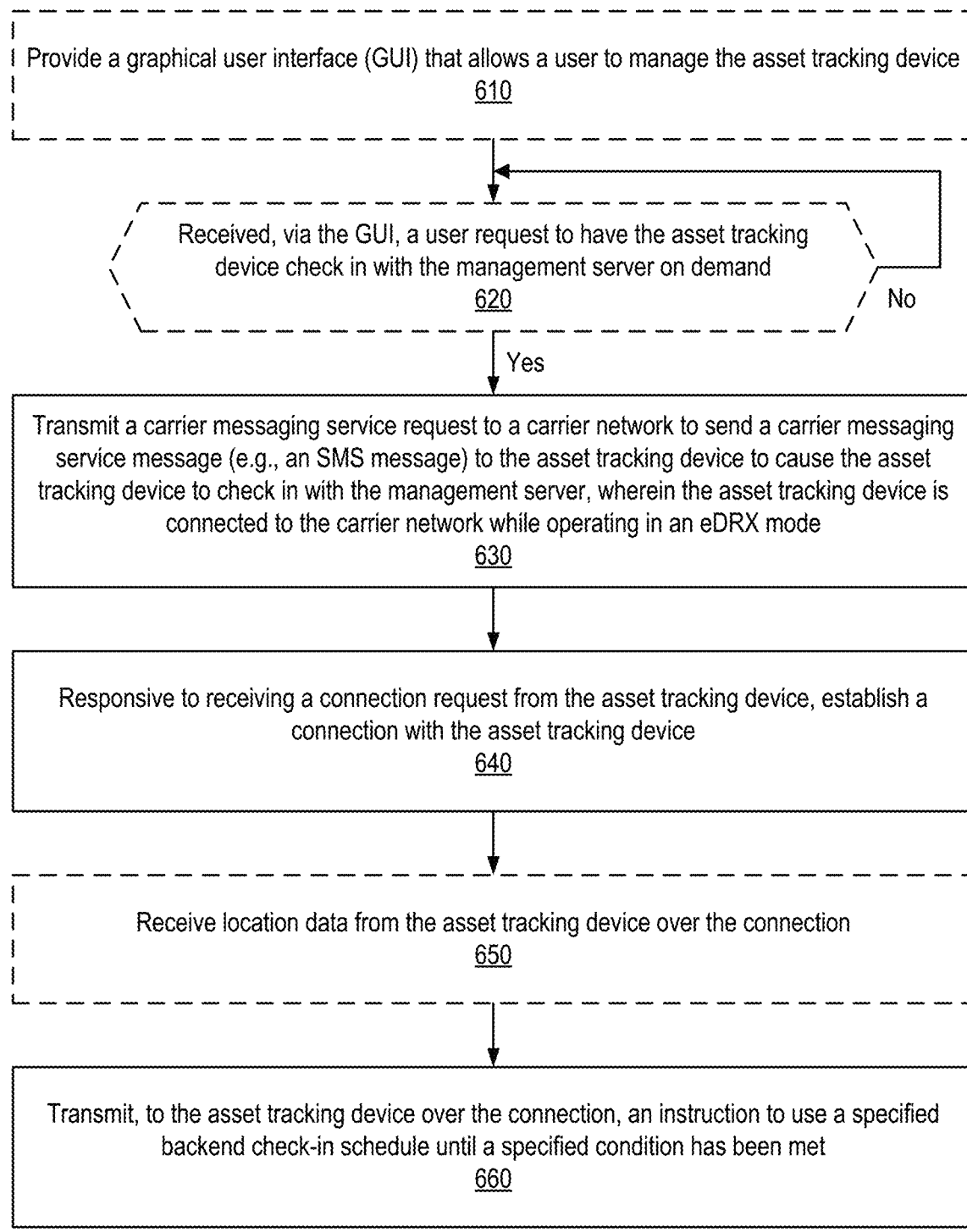
FIG. 6 is a flow diagram showing a method that may be performed by a management server, according to some embodiments.

FIG. 6 is a flow diagram showing a method that may be performed by a management server, according to some embodiments. The management server may be implemented by one or more electronic/network devices. In an implementation, the management server is implemented in a cloud.

In an embodiment, at operation 610, the management server provides a GUI that allows a user to manage the asset tracking device. In such an embodiment, at operation 620, the management server may determine whether it received, via the GUI, a user request to have the asset tracking device check in with the management server on demand. If the management server did not receive such a user request, the management server waits until such user request is received. If the management server receives such a user request, the management server may perform operation 630.

At operation 630, the management server transmits a carrier messaging service request to the carrier network to send a carrier messaging service message to the asset tracking device to cause the asset tracking device to check in with the management server, wherein the asset tracking device is connected to the carrier network while operating in an eDRX mode. In an embodiment, the carrier messaging service message is an SMS message. In an embodiment, the carrier messaging service message comprises a command for the asset tracking device. In an embodiment, the command is a command to send location data to the management server. In an embodiment, the command is a command to perform a firmware upgrade.

At operation 640, responsive to receiving a connection request from the asset tracking device, the management server establishes a connection with the asset tracking device.

In an embodiment, at operation 650, the management server receives location data from the asset tracking device over the connection.

At operation 660, the management server transmits, to the asset tracking device over the connection, an instruction to use a specified backend check-in schedule until a specified condition has been met. In an embodiment, the specified condition is an expiration of a specified duration. In an embodiment, the specified backend check-in schedule has more frequent check-ins compared to the asset tracking device's previously-used or default backend check-in schedule (e.g., to help better locate the asset).

In an embodiment, the management sever transmits, to the asset tracking device before the condition is met, a second instruction to use a second specified backend check-in schedule until a second specified condition is met.

In an embodiment, the management server transmits, to the asset tracking device, a second instruction to use a particular eDRX configuration. In an embodiment, the particular eDRX configuration comprises an eDRX cycle length that is longer than a NAT timeout length used by the carrier network. In an embodiment, the particular eDRX configuration comprises an eDRX cycle length of eleven minutes or 655 seconds. In an embodiment, the asset tracking device receives, from the asset tracking device, a message indicating that the carrier network rejected the asset tracking device's request to use the particular eDRX configuration. Responsive to receiving the message, the management server may cause a notification to be displayed to a user indicating that the carrier network rejected the asset tracking device's request to use the particular eDRX configuration.

Architecture

The asset tracking device and the management server described herein may be electronic devices. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment may be implemented using different combinations of software, firmware, and/or hardware.

Figure 7:
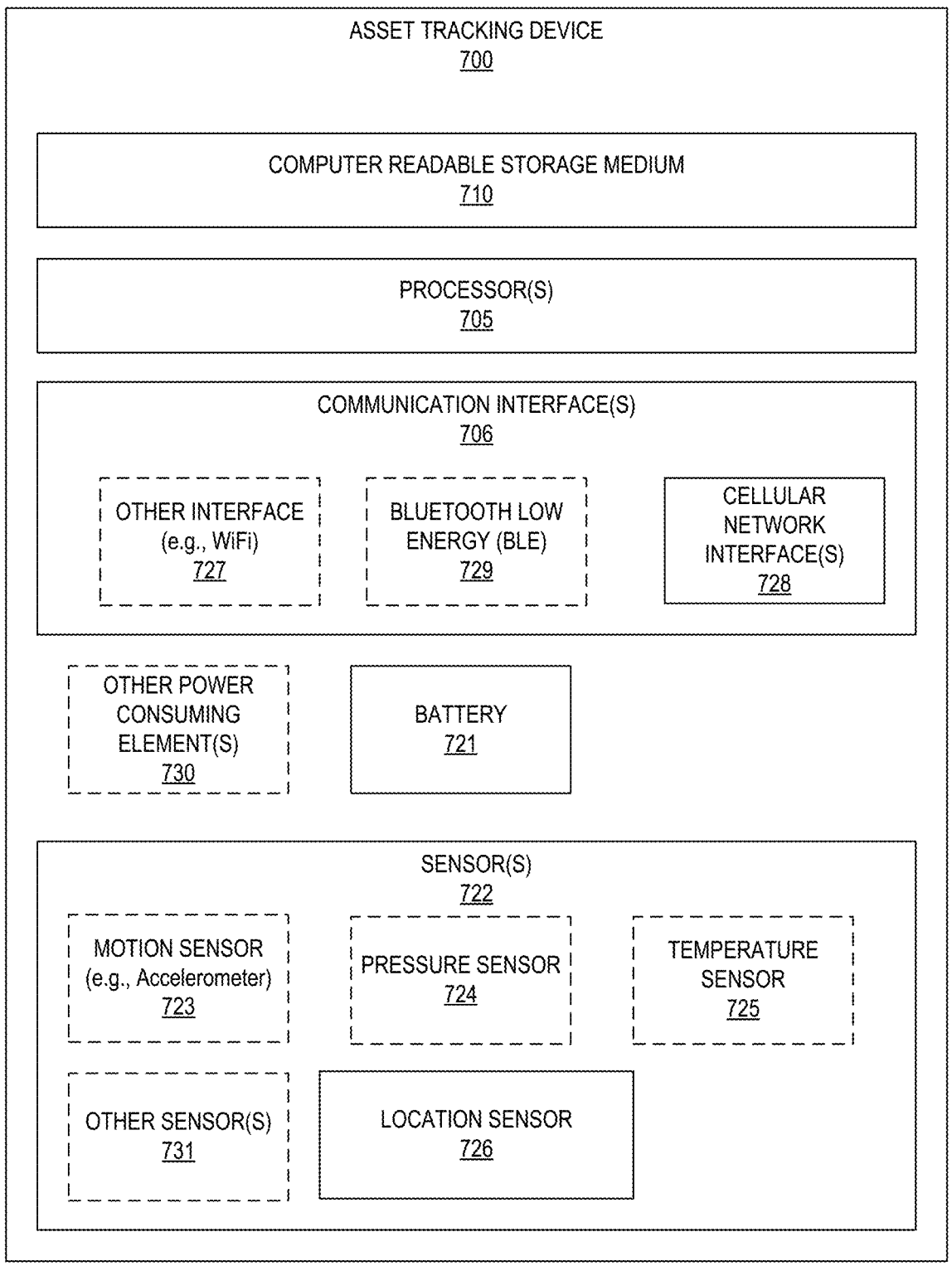
FIG. 7 is a diagram showing an example asset tracking device that can be used in some embodiments.

FIG. 7 is a diagram showing an example asset tracking device that can be used in some embodiments. Asset tracking device 700 includes one or more processors 705. The asset tracking device 700 includes computer readable storage medium 710, which is coupled to the processor(s) 705. The computer readable storage medium 710 may be used for storing data, metadata, and programs for execution by the processor(s) 705. For example, the depicted computer readable storage medium 710 may store a ping-on-demand module that, when executed by the processor(s) 705, causes the asset tracking device 700 to perform operations for providing ping-on-demand functionality, as described herein.

The asset tracking device 700 also includes one or more communication interfaces 706, which are provided to allow a user to provide input to, receive output from, and otherwise transfer data to and from the system. Exemplary Input/Output devices and interfaces 706 include wired and wireless transceivers, such as Joint Test Action Group (JTAG) transceiver, a Bluetooth Low Energy (LE) transceiver 729, an IEEE 802.11 transceiver 727, an infrared transceiver, a multi-cellular telephony transceiver (e.g., 2G, 3G, 4G) 728, or another wireless protocol to connect the asset tracking device 700 with another device, external component, or a network and receive stored instructions, data, tokens, etc. It will be appreciated that one or more buses may be used to interconnect the various components shown in FIG. 7.

The asset tracking device 700 may also include one or more sensor(s) to detect physical events and store sensor measurements in the computer readable storage medium 710 in response to the detection of the physical events. In some exemplary embodiments, the one or more sensor(s) include at least a location sensor 726 (e.g., GPS sensor). The asset tracking device 700 may further include one or more additional sensors, such as the motion sensor 723 (e.g., accelerometer), the pressure sensor 724, the temperature sensor 725, an ambient light sensor, a gyroscope, etc.

The asset tracking device 700 includes a battery 721. The battery 721 is used to power the asset tracking device 700. The battery 721 can be replaceable. Each of the elements of the asset tracking device 700 (except the battery 721) are power consuming components that operate with power received from the battery 721. In some embodiments, the asset tracking device 700 may include additional power consuming elements 730.

In some embodiments, the asset tracking device 700 may include a multi-use button that enables actuation of several operations to be performed by the asset tracking device 700. For example, the multi-use button can be used to trigger data transmission on demand. When pressed by a user, the button causes the tracking device to transmit current sensor measurement data (e.g., location data and/or other sensor measurements) to the management server. The multi-use button may also be used to activate a tracking device that is in a passive mode of operations. In some embodiments, the multi-use button can be used to reboot the asset tracking device 700. The multi-use button can be used to trigger diagnostics operations of the asset tracking device 700. The diagnostics performed by the asset tracking device 700 causes a light-emitting diode (LED) to blink according to different patterns to indicate the type of problems in the asset tracking device 700. Each blinking pattern of the LED can be associated with a different cause of malfunction of the asset tracking device 700 and allows a user to immediately identify the malfunction without requiring lengthy and in-depth diagnostics of the asset tracking device by the user.

In an embodiment, the asset tracking device 700 includes a BLE transceiver 729. The BLE transceiver 729 can be used to enable the asset tracking device 700 to connect with one or more external wireless sensing devices (WSDs). In some embodiments, the asset tracking device 700 may establish communication channels with one or more WSDs. In some embodiments, the communication channels are secure such that only authorized and authenticated WSDs can connect with the asset tracking device 700. In an exemplary embodiment, the devices may negotiate the establishment of the secure communication channel using a shared secret and an encryption protocol (e.g., Bluetooth Low Energy (BLE) Secure Connections pairing model). In an embodiment, the secret is burnt in the WSD at the time of manufacture. In some embodiments, the connection is performed according to a BLE pairing mechanism, where the tracking device scans for nearby WSDs which are not yet paired to another gateway device or another asset tracking device and detects the advertisement(s) transmitted by the WSDs. When the secure communication is established, the WSDs may transmit any recorded sensor measurements to the asset tracking device 700 that are received via the BLE transceiver 729. The pairing with the WSDs enables the detection and understanding of the presence of other assets (e.g., WSDs) that are located in the vicinity of the tracking device. In some embodiments, the BLE transceiver 729 may additionally or alternatively enable the tracking device to perform real time event detection and to trigger an action on and/or control on one more actuators.

It will be appreciated that additional components, not shown, may also be part of the asset tracking device 700, and, in certain embodiments, fewer components than that shown in FIG. 7 may also be used in an asset tracking device 700.

Figure 8:
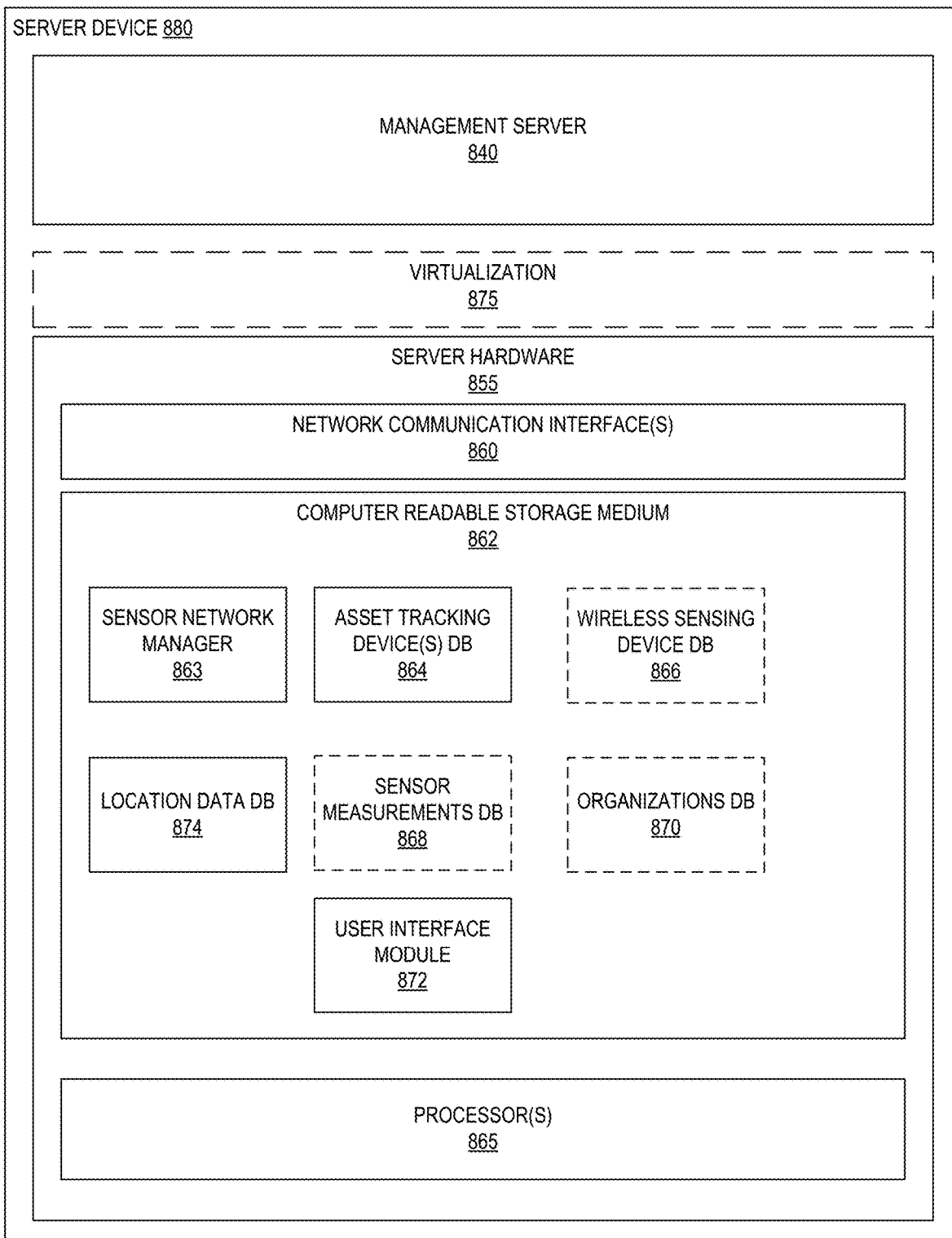
FIG. 8 is a diagram showing an example management server that can be used in some embodiments.

FIG. 8 is a diagram showing an example management server that can be used in some embodiments. Management server 840 may be a Web or cloud server, or a cluster of servers, running on server hardware. In one embodiment, the management server 840 works for both single and multi-tenant installations, meaning that multiple organizations with different administrators may have wireless sensing devices and/or tracking devices managed by the same management server.

According to one embodiment, management server 840 is implemented on a server device 880 which includes server hardware 855. Server hardware 855 includes network communication interfaces 860 coupled with one or more processor(s) 865, and a computer readable storage medium 862. The computer readable storage medium 862 includes a sensor network manager 863 used to configure and manage the WSDs and tracking devices for each organization. For example, the sensor network manager 863 may include a registration module which receives and manages information related to the WSDs and asset tracking devices that is assigned to the devices at the time of manufacture. The sensor network manager 863 may also include a claiming module which is used when devices are claimed by organizations (e.g., the claiming may be performed at least in part by populating the tracking devices database 864, the wireless sensing device database 866, and the organization database 870 with appropriate information when the WSDs and tracking devices are associated to an organization).

In an embodiment, the sensor network manager 863 provides a user interface module 872 used to create a Web interface to allow administrators to create and log into an account associated with an organization to which a set of asset tracking devices belong. A set of WSDs can also belong to the organization and the sensor network manager 863 may provide the user interface module 872 for managing and configuring the asset tracking devices and the WSDs. The computer readable storage medium 862 further includes the location data database 874 (including location data received from the tracking device(s)), an optional sensor measurements database 868 (including data indicative of sensor measurements received from the WSDs or the tracking devices), asset tracking devices database 864 (including information regarding the asset tracking devices), a wireless sensing device database 866 (including information regarding the WSDs), and an organizations database 870 (including information regarding the organizations to which the WSDs and/or asset tracking devices belong).

While one embodiment does not implement virtualization, alternative embodiments may use different forms of virtualization-represented by a virtualization layer 875. In these embodiments, the management server 840 and the hardware that executes it form a virtual management server which is a software instance of the modules stored on the computer readable storage medium 862. The server device 880 can be used to perform the operations of a management server as described elsewhere herein.

While some components of the tracking device or the management server are illustrated as code stored on the computer readable storage medium, in other embodiments the modules may be implemented in hardware or in a combination of hardware and software.

Additionally, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by an asset tracking device mounted on an asset to track the asset, the method comprising:
   receiving, while operating in an extended discontinuous reception (eDRX) mode, a carrier messaging service message from a carrier network;
   responsive to receiving the carrier messaging service message from the carrier network, transmitting a connection request to a management server to establish a connection with the management server;
   receiving, from the management server over the connection, an instruction to use a specified backend check-in schedule until a specified condition is met;
   responsive to receiving the instruction, using the specified backend check-in schedule to check in with the management server; and
   responsive to determining that the specified condition has been met, reverting back to using a default backend check-in schedule to check in with the management server, wherein the asset tracking device attempts to check in with the management server more frequently when using the specified backend check-in schedule compared to when the asset tracking device uses the default backend check-in schedule.

2. The method of claim 1, further comprising:
   transmitting location data to the management server over the connection.

3. The method of claim 1, wherein the asset tracking device operates in the eDRX mode using an eDRX cycle length that is longer than a network address translation (NAT) timeout length used by the carrier network.

4. The method of claim 1, wherein the asset tracking device operates in the eDRX mode using an eDRX cycle length of eleven minutes or 655 seconds.

5. The method of claim 1, wherein the carrier messaging service message comprises a command for the asset tracking device.

6. The method of claim 5, wherein the command is a command to send location data to the management server.

7. The method of claim 5, wherein the command is a command to perform a firmware upgrade.

8. The method of claim 1, further comprising:
   transmitting an eDRX configuration request to the carrier network requesting use of a particular eDRX configuration; and
   responsive to receiving an eDRX configuration response from the carrier network indicating that the eDRX configuration request is rejected, transmitting a message to the management server indicating that the eDRX configuration request has been rejected.

9. The method of claim 8, further comprising:
receiving, from the management server, a second instruction to use the particular eDRX configuration, wherein the eDRX configuration request is transmitted in response to receiving the second instruction.

10. The method of claim 1, further comprising:
receiving, from the management server, a second instruction to use a second specified backend check-in schedule until a second specified condition is met;
responsive to receiving the second instruction, using the second specified backend check-in schedule to check in with the management server;
receiving, from the management server before the second specified condition is met, a third instruction to use a third specified backend check-in schedule until a third specified condition is met;
responsive to receiving the third instruction, using the third specified backend check-in schedule instead of the second specified backend check-in schedule to check in with the management server; and
responsive to determining that the third specified condition has been met, reverting back to using the default backend check-in schedule to check in with the management server.

11. The method of claim 1, wherein the carrier messaging service message is a short messaging service (SMS) message.

12. The method of claim 1, wherein the specified condition is an expiration of a specified duration.

13. An asset tracking device to be mounted to an asset to track the asset, the asset tracking device comprising:

a processor; and
a non-transitory computer readable storage medium having instructions stored therein, which when executed by the processor, cause the asset tracking device to:
receive, while operating in an extended discontinuous reception (eDRX) mode, a carrier messaging service message from a carrier network;
responsive to receiving the carrier messaging service message from the carrier network, transmit a connection request to a management server to establish a connection with the management server;
receive, from the management server over the connection, an instruction to use a specified backend check-in schedule until a specified condition is met;
responsive to receiving the instruction, use the specified backend check-in schedule to check in with the management server; and
responsive to determining that the specified condition has been met, revert back to using a default backend check-in schedule to check in with the management server, wherein the asset tracking device attempts to check in with the management server more frequently when using the specified backend check-in schedule compared to when the asset tracking device uses the default backend check-in schedule.

14. The asset tracking device of claim 13, wherein the carrier messaging service message is a short messaging service (SMS) message.

15. The asset tracking device of claim 13, wherein the carrier messaging service message comprises a command for the asset tracking device.

\* \* \* \* \*